United States Patent
Delfosse et al.

(10) Patent No.: US 10,899,929 B2
(45) Date of Patent: Jan. 26, 2021

(54) CALCIUM/MAGNESIUM COMPOUND SLURRY FOR BITUMINOUS ROAD MATERIAL

(71) Applicant: LHOIST RECHERCHE ET DEVELOPPEMENT, Ottignies-Louvain-la-Neuve (BE)

(72) Inventors: Frédéric Delfosse, Pessac (FR); Ivan Drouadaine, Saint Medard en Jalles (FR); Bernard Laurent, Lustin (BE); Didier Lesueur, Braine le Chateau (BE)

(73) Assignee: LHOIST RECHERCHE ET DEVELOPMENT, Ottignies-Louvain-la-Neuve (BE)

( * ) Notice: Subject to any disclaimer, the term of this patent is extended or adjusted under 35 U.S.C. 154(b) by 699 days.

(21) Appl. No.: 15/324,844

(22) PCT Filed: Jul. 10, 2015

(86) PCT No.: PCT/EP2015/065893
§ 371 (c)(1),
(2) Date: Jan. 9, 2017

(87) PCT Pub. No.: WO2016/005591
PCT Pub. Date: Jan. 14, 2016

(65) Prior Publication Data
US 2017/0204268 A1    Jul. 20, 2017

(30) Foreign Application Priority Data

Jul. 10, 2014 (BE) .................................. 2014/0527
Jul. 10, 2014 (FR) ..................................... 14 56653

(51) Int. Cl.
*C08L 95/00* (2006.01)
*E01C 7/24* (2006.01)
*C04B 26/26* (2006.01)

(52) U.S. Cl.
CPC .............. *C08L 95/005* (2013.01); *E01C 7/24* (2013.01); *C04B 26/26* (2013.01); *C08L 2555/28* (2013.01); *C08L 2555/52* (2013.01)

(58) Field of Classification Search
CPC .. C08L 95/00; C08L 2555/28; C08L 2555/52; C09D 195/00; C04B 26/26;
(Continued)

(56) References Cited

U.S. PATENT DOCUMENTS

| | | |
|---|---|---|
| 2,399,411 A | 4/1946 | Watts et al. |
| 5,021,476 A | 6/1991 | Pinomaa |

(Continued)

FOREIGN PATENT DOCUMENTS

| | | |
|---|---|---|
| DE | 2 150 958 A1 | 4/1973 |
| EP | 0 179 510 A1 | 4/1986 |

(Continued)

OTHER PUBLICATIONS

Bayomy, "Development and Analysis of Cement-coated Aggregates for Asphalt Mixtures," ASTM Special Technical Publication, No. 1147, Oct. 12, 1992, pp. 19-34, XP-002108078.

(Continued)

*Primary Examiner* — Alexandra M Moore
(74) *Attorney, Agent, or Firm* — Birch, Stewart, Kolasch & Birch, LLP

(57) ABSTRACT

The invention concerns the use of an aqueous suspension of solid particles of a calcium/magnesium compound of formula (A): $nCa(OH)_2 \cdot mCaCO_3 \cdot aMgO \cdot bMg(OH)_2 \cdot cMgCO_3$.I as an agent regulating the breaking of a bitumen emulsion. The invention also concerns a bituminous road material (Continued)

obtained by mixing a solid mineral fraction with a cationic bitumen emulsion of the type binder in water, characterised in that it involves adding, to the mineral fraction, an aqueous suspension of solid particles of a calcium/magnesium compound of formula (A). The invention also concerns a method for preparing a material according to the invention and the use of same for producing surface courses, tack coats or temporary surface courses. The invention finally concerns a method for obtaining a tack coat by spreading a cationic bitumen emulsion, comprising a step of applying an aqueous suspension of solid particles of a calcium/magnesium compound of formula (A).

19 Claims, 3 Drawing Sheets

(58) Field of Classification Search
CPC ..... E01C 7/24; B01J 13/0086; B01F 17/0007; B01F 17/0021; B01F 17/0078; B01F 17/0085; C01F 5/00; C01F 5/14; C01F 5/16; C01F 5/24; C01P 2004/80; C01P 2006/22

See application file for complete search history.

(56) References Cited

U.S. PATENT DOCUMENTS

| | | | |
|---|---|---|---|
| 5,256,195 A * | 10/1993 | Redelius | C08L 95/005 106/277 |
| 6,156,113 A | 12/2000 | Pasquier | |
| 2003/0207101 A1 | 11/2003 | Huege et al. | |
| 2008/0146477 A1 | 6/2008 | Mentink et al. | |
| 2008/0250975 A1 | 10/2008 | Deneuvillers et al. | |
| 2014/0356526 A1* | 12/2014 | O'Connell | C09D 195/005 427/136 |
| 2015/0258519 A1 | 9/2015 | Laurent | |

FOREIGN PATENT DOCUMENTS

| | | |
|---|---|---|
| EP | 0 330 281 A2 | 8/1989 |
| EP | 0 666 886 B1 | 3/1998 |
| EP | 0 900 822 A1 | 3/1999 |
| FR | 1316712 A | 2/1963 |
| FR | 2 573 455 A1 | 5/1986 |
| FR | 2 721 043 A1 | 12/1995 |
| FR | 2 786 603 A1 | 6/2000 |
| FR | 2 891 838 A1 | 4/2007 |
| FR | 2 910 477 A1 | 6/2008 |
| FR | 3 017 385 A1 | 8/2015 |
| GB | 1011260 A | 11/1965 |
| GB | 1226234 A | 3/1971 |
| GB | 2 167 975 A | 6/1986 |
| WO | WO 94/10247 A1 | 5/1994 |
| WO | WO 98/51614 A1 | 11/1998 |
| WO | WO 03/002820 A1 | 1/2003 |
| WO | WO 2006/070104 A1 | 7/2006 |
| WO | WO 2008/077888 A1 | 7/2008 |
| WO | WO 2014/064234 A1 | 5/2014 |

OTHER PUBLICATIONS

Belgium Search Report and Written Opinion, dated Mar. 11, 2015, for Belgium Application No. 201400527.
Database WPI Week 200273, Thomson Scientific, London, GB; AN 2002-680597, XP-002738737, 2002, 1 page.
French Preliminary Search Report and Written Opinion, dated Apr. 24, 2015, for French Application No. 1456653.
French Preliminary Search Report and Written Opinion, dated Nov. 16, 2015, for French Application No. 1556592.
Written Opinion of the International Searching Authority and International Search Report (forms PCT/ISA237, PCT/ISA/210 and PCT/ISA220), dated Sep. 18, 2015, for International Application No. PCT/EP2015/065893.

* cited by examiner

CALCIUM/MAGNESIUM COMPOUND SLURRY FOR BITUMINOUS ROAD MATERIAL

The present invention relates to a novel agent regulating the breaking of bitumen emulsions. These bitumen emulsions are used in the production of bituminous road materials, which can be obtained by coating or by spreading.

Bitumen emulsions have the great advantage of being able to be used at temperatures below 100° C. The emulsion is a vector making it possible to supply bitumen, which must be stable during storage before its use but the breaking of which is sought when it is applied. Breaking is here understood as the passage from an initial state where the bitumen is dispersed in the form of fine droplets in an aqueous phase (emulsion) to a final state where the bitumen constitutes a continuous film that can for example coat aggregates. In this case, on contact with this mineral fraction, the emulsion breaks, the water separates from the bitumen then is eliminated by drainage and/or evaporation. There remains then a more or less rigid bituminous binder, often called "residual binder" to signify that it comes from the breaking of an emulsion.

Bitumen emulsions used in road works must satisfy a certain number of conditions notably relating to their breaking speed.

Bitumen road emulsions are emulsions comprising bitumen emulsified in an aqueous phase. In practice, the emulsions are cationic emulsions. The most widely used emulsifiers are organic compounds from the class of amines, pasty or liquid at ambient temperature. Since the emulsifiers are insoluble in water, a sufficient quantity of a mineral or organic acid is added in order to ionise the amine functions of the emulsifiers to enable their dissolution in water. This emulsifier-water-acid mixture is called aqueous phase. In certain cases, it may also be advantageous to use jointly an amphoteric surfactant.

To facilitate and control the breaking of the emulsion, a breaking agent is used. This breaking agent is added to the solid mineral fraction, when it is present. This additive is, as a general rule, cement or hydrated lime. The latter, also called slaked lime, is constituted mainly of calcium dihydroxide and is obtained by calcination of limestone rock (calcium carbonate) enabling the formation of quick lime (calcium oxide), which is then hydrated to obtain hydrated lime. It is in powdery (dry) form or in suspension in water (lime slurry).

Within the scope of the development of bituminous road materials, the regulation of the pH of the medium stands out as a key factor in the formulation because it depends on numerous factors: choice of emulsifiers, nature of the acid in the aqueous phase, nature of the aggregates, origin of the bitumen, etc. In certain cases, the regulation of the pH of the medium is vital.

The invention will be more particularly exemplified by cold mix bituminous materials (CMBM). For naphthenic bitumens, the use of lime or cement with hydrochloric acid imposes, on the plateau after stabilisation, a basic pH of the order of 11-13, whatever the nature of the aggregates (see FIG. 1). These pH conditions prove to be favourable to obtain an appropriate breakage kinetic regarding the application. On the other hand, for paraffinic bitumens, obtaining a cold mix bituminous material with a suitable rise in cohesion is very difficult. The use of particular emulsifiers making it possible to use paraffinic bitumens (application n° FR14/51144, not yet published) has been described. In this application, CMBM are formulated with a specific acid (phosphoric acid or polyphosphoric acid) and by adding cement to the solid mineral fraction. It has been noted that the use of calcic lime slurry does not make it possible to meet the specifications for CMBM based on paraffinic bitumen: workability time, break time, etc. Yet, in practice, the use of cement, which is a powdery additive, poses handling constraints.

An agent that makes it possible to control the breaking of a bitumen emulsion is thus still being sought. For road materials obtained by coating, this additive must make it possible to regulate the kinetic of pH rise during mixing of the bitumen emulsion with the solid mineral fraction and ensure the workability time, then ensure the quality of breaking of the emulsion, and improve the properties of adhesiveness and cohesion.

In a surprising manner, the inventors have noted that certain calcium/magnesium slurries may be used to control the breaking of bitumen emulsions.

The invention thus relates to:
The use of an aqueous suspension of solid particles of a calcium/magnesium compound of formula (A)

$$nCa(OH)_2 \cdot mCaCO_3 \cdot aMgO \cdot bMg(OH)_2 \cdot cMgCO_3 \cdot I$$

wherein n, m, a, b and c represent molar coefficients for the calcium/magnesium compound in suspension in the aqueous phase such that
- n+m=x represents the proportion of calcium phase present in the calcium/magnesium compound and where 0<x≤1
- a+b+c=y represents the proportion of magnesium phase present in the calcium/magnesium compound and where 0<y≤1
- x/y represents the calcium phase/magnesium phase ratio
- I represents all of the various additional compounds as an agent regulating the breaking of a cationic bitumen emulsion.

bituminous road materials obtained by mixing a solid mineral fraction and a bitumen emulsion in the presence of this emulsion breaking regulation agent. The bituminous road materials may for example be CMBM, emulsified coated materials, grave emulsion, emulsified bituminous concretes a method for obtaining a tack coat by spreading a cationic bitumen emulsion, comprising a step of application of this emulsion breaking regulation agent.

Hereafter, the emulsion breaking regulation agent could also be called, for simplification, breaking agent or breaker.

These new breaking agents are excellent alternatives to cement. They make it possible to extend the pH range at which the formulator of bituminous road materials can work and thus to provide him with great flexibility for the choice of the types of aggregates, the emulsifying composition, the acid present in the aqueous phase and the bitumen (naphthenic or paraffinic) as a function of the requirements definition thereof. The use of these agents in bituminous road materials, in particular obtained by coating, makes it possible to buffer the pH rise of the aggregates, which leaves more flexibility for the formulation of the bitumen emulsion (choice of the emulsifying composition, of the acid). It is in fact possible to regulate for example the workability of the aggregates/emulsion mixture while playing on the pH rise.

The slurry of calcium/magnesium compound is used to control the pH rise. In fact, it is going to play the role of buffer and thus during its mixing with the other constituents it is going to enable a progressive pH rise kinetic. The pH rise curves are characterised by a plateau at the target pH. Advantageously, it is also sought to slow down the pH rise.

The use of slurries of calcium/magnesium compounds is without prejudice to the other desired mechanical properties, in particular adhesion, workability. The calcium/magnesium compound of formula (A) according to the invention may be formulated in the form of a suspension, which allows to avoid the handling of powders.

The invention relates to the use of an aqueous suspension of solid particles of a calcium/magnesium compound of formula (A):

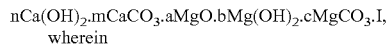

wherein n, m, a, b and c represent molar coefficients for the calcium/magnesium compound in suspension in the aqueous phase such that
    n+m=x represents the proportion of calcium phase present in the calcium/magnesium compound and where 0<x≤1
    a+b+c=y represents the proportion of magnesium phase present in the calcium/magnesium compound and where 0<y≤1
    x/y represents the calcium phase/magnesium phase ratio
    I represents all of the various additional compounds
    as an agent regulating the breaking a cationic bitumen emulsion.

In a particular variant of the invention, the calcium/magnesium compound is of formula (AA):

x, a and b represent molar coefficients such that
    a+b=y represents the proportion of magnesium phase present in the calcium/magnesium compound and where 0<y≤1
    x=n, represents the proportion of calcium phase present in the calcium/magnesium compound and where 0<x≤1
    x/y represents the calcium phase/magnesium phase ratio
    D represents all of the various additional compounds.

Within the scope of the invention, "calcium/magnesium slurries" will also designate aqueous suspensions of solid particles of a calcium/magnesium compound as defined.

Figure 1:
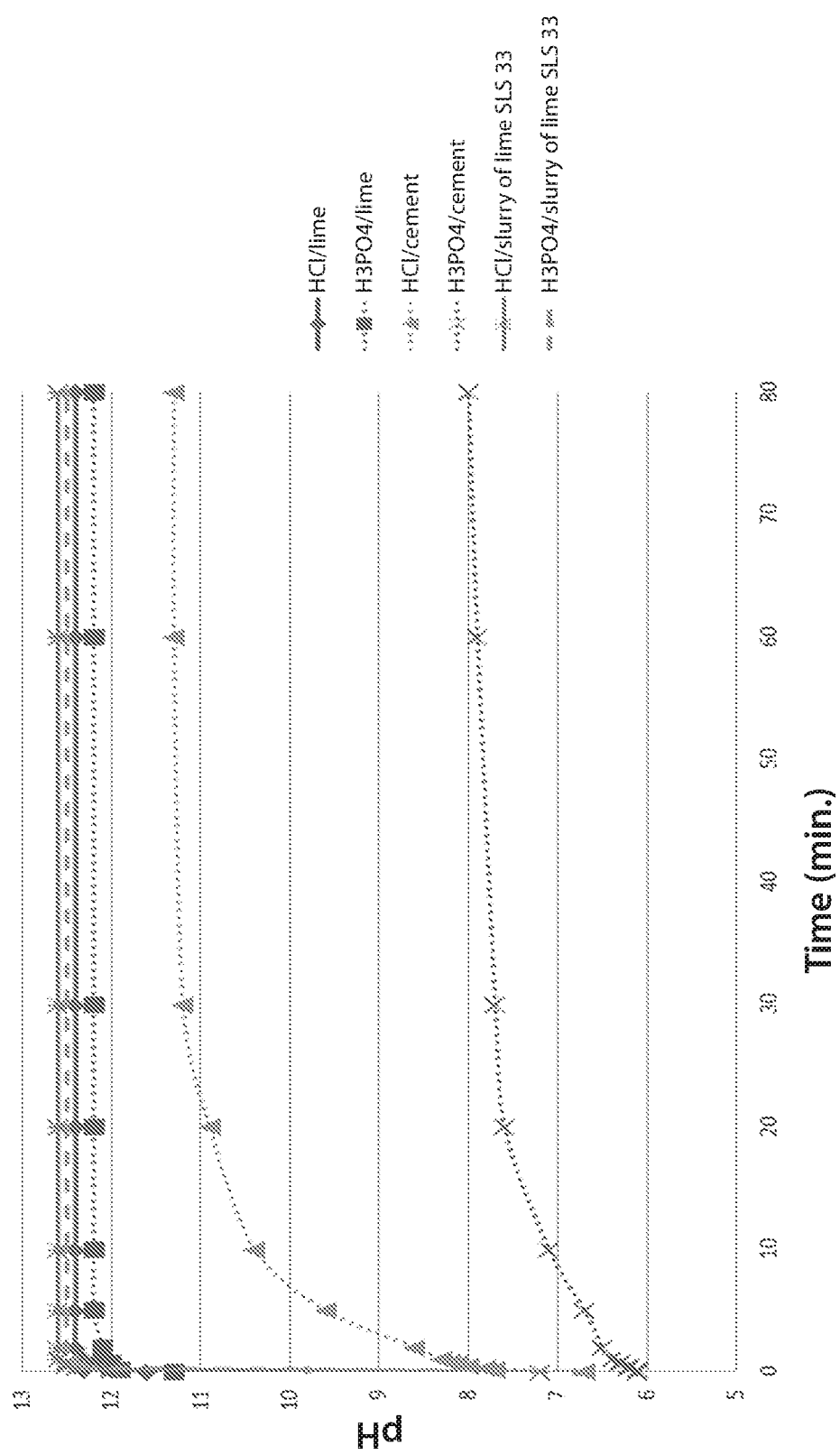
FIG. 1 : Rise of the pH as a function of time in a CMBM comprising 20 g of a filler (63 μm passing from the Moreau quarry), 18 g of demineralised water, 11 g of water acidified to pH =2 with an acid (HC1 or $H_3PO_4$) and 0.1 g of a reference mineral additive (lime, cement or slurry of SLS 33 lime) : solid line, diamonds : CMBM with HC1/lime; dotted line, squares : CMBM with $H_3PO_4$/lime; dotted line, triangles : CMBM with HC1/cement; dotted line, crosses : CMBM with $H_3PO_4$/cement; solid line, stars : CMBM with HC1/slurry of SLS 33 lime; dashes, circles : CMBM with $H_3PO_4$/slurry SLS 33 lime.

Breaking Agent.

The breaking agent is at least one aqueous suspension comprising solid particles of a calcium/magnesium compound of formula (A), such as (AA).

The values of the molar fractions are defined for the calcium/magnesium compound, before suspension in the aqueous phase.

Calcium/Magnesium Compound:

In a particular form of embodiment of the present invention, n is less than 0.7, preferably less than 0.6 or even less than 0.5. Thus, preferentially, the coefficient n varies between 0.01 and 0.7, or advantageously from 0.02 to 0.6 or even more advantageously between 0.03 to 0.5. In another particular form of embodiment of the present invention, x/y is comprised between 0.7 and 1.3, more particularly x/y is around 1. "Around 1" designates 1±0.1.

In another particular form of embodiment of the present invention, for the compound of formula (AA), x/y is comprised between 0.8 and 1.2, more particularly x/y is around 1. "Around 1" designates 1±0.1.

In another particular form of embodiment of the present invention, the molar coefficient a equals 0. For the compound (AA), x/y then corresponds to the ratio x/b.

In another particular form of embodiment of the present invention, x, a and c are each close to 0. "Close to 0" designates the interval from 0 to 0.1.

I represents various additional compounds notably comprising 1) impurities usually present in natural calcium/magnesium compounds such as dolomites, magnesium limes or dolomitic limes, namely phases derived from $SiO_2$, $Al_2O_3$, $Fe_2O_3$, MnO, $P_2O_5$, $K_2O$ and/or $SO_3$, 2) compounds of silicates or aluminates of calcium and/or magnesium type.

D represents various additional compounds I and 3) unfired products or re-carbonated products ($MgCO_3$ and $CaCO_3$), or also 4) residual quick lime (CaO) from incomplete hydration.

Preferably, the sum of these various compounds I does not exceed 10% by weight, preferably 5%, preferably 3% or even 2% of the weight of the calcium/magnesium compound. Thus, preferably, the percentage by weight of I, compared to the total weight of the calcium/magnesium compound of formula (A), varies from 0.1 to 10%, advantageously from 0.2 to 5%, more advantageously from 0.3 to 3%, even more advantageously from 0.4 to 2%.

Preferably, the sum of these various compounds D does not exceed 40% by weight, preferably 30%, preferably 20% or even 10% of the weight of the calcium/magnesium compound of formula (AA). Thus, preferably, the percentage by weight of D, compared to the total weight of the calcium/magnesium compound of formula (AA), varies from 0.1 to 40%, advantageously from 0.2 to 30%, more advantageously from 0.3 to 20%, even more advantageously from 0.4 to 10%.

In a particular form of embodiment of the present invention, said calcium/magnesium compound is derived from the hydration of compounds selected from the group constituted of quick dolomite, semi-calcined or totally calcined, mixed calcium/magnesium compounds, in particular mixed oxides of calcium and magnesium, wherein the MgO content is substantial, namely greater than 10% by weight compared to the total weight of the mixed oxide, for which the molar coefficient x/y is then less than 9, and mixtures thereof.

In another particular form of embodiment of the present invention, said calcium/magnesium compound is a magnesium dihydroxide, obtained by grinding of brucite, by hydration of MgO or by a synthesis method, in particular by a synthesis method which, from hydrated dolomite, separates the calcium phase from the magnesium phase by forming calcium chloride (using marine magnesium chloride) or calcium carbonate (using $CO_2$).

The calcium/magnesium compound is formulated in non-powdery form. Thus, the calcium/magnesium compound is in the form of a suspension of solid particles in an aqueous phase, which can notably have the consistency of a paste. This aqueous phase is advantageously water, being able to comprise additives. The dry matter content by weight varies advantageously from 5% by weight to 50% by weight, compared to the total weight of the suspension. The dry matter content by weight is advantageously greater than 5% by weight, preferably greater than 10% by weight, particularly greater than 15% by weight, more particularly greater than 30% by weight, compared to the total weight of the suspension. In a particular form of embodiment, the calcium/magnesium suspension according to the present invention is obtained by dilution of a more concentrated calcium/magnesium suspension, of which notably the dry matter content is greater than 20% by weight, particularly greater than 30% by weight, in particular greater than 40% by weight, more particularly greater than 50% by weight, compared to the total weight of the suspension or the paste.

In another particular form of embodiment, the calcium/magnesium suspension according to the present invention is obtained by mixing two or more calcium/magnesium suspensions of potentially different compositions and/or potentially different concentrations. Thus, each composition of calcium/magnesium suspension may or may not enter into the field of the invention.

The solid particles have a d90 comprised between 4 and 500 µm, preferably less than 200 µm, in particular less than 100 µm, more particularly less than 20 µm, and preferably greater than 10 µm, in particular greater than 20 µm, more particularly greater than 40 µm, and a d50 comprised between 1 and 200 µm, preferably less than 100 µm, in particular less than 50 µm, more particularly less than 20 µm, and preferably greater than 1.2 µm, in particular greater than 2 µm.

The notation dx represents a diameter, expressed in µm, compared to which x % by volume of the particles measured have a diameter smaller than or equal to this value. The particle sizes are determined by particle size laser in methanol and without ultrasound.

In a particular form of embodiment of the present invention, the stability and/or the viscosity of said suspension is modified by playing on the size of the particles of the calcium/magnesium compound, for example by wet grinding or by separation with air (cyclone treatment) of the calcium/magnesium product before it is placed in suspension. In this case, the solid particles of calcium/magnesium compound have advantageously a d90 less than 30 µm, in particular less than 20 µm, more particularly less than 10 µm and a d50 preferably less than 8 µm, in particular less than 6 µm.

In another particular form of embodiment of the present invention, the stability and/or the viscosity of said suspension is modified by the addition of additives to said suspension, for example sugar compounds selected from carbohydrates, soluble mono-, di-, poly- and oligo-saccharides as well as soluble derivatives thereof obtained notably by hydrogenation and oxidation, polyacrylates, polycarboxylates, polyamines, polyphosphonates or mixtures thereof. Stability of said suspension means that there are no major variations over time of said suspension toward decantation phenomena but also toward the viscosity thereof. Advantageously, the viscosity of said suspension, measured at ambient temperature with a Brookfield viscometer equipped with a LV spindle rotating at 100 rpm, is less than or equal to 1500 mPa·s, preferably less than or equal to 1000 mPa·s.

The calcium/magnesium compound content, expressed in dry solids, varies advantageously from 0.01 to 0.5 ppc, more advantageously from 0.05 to 0.2 ppc by weight compared to the weight of the dry solid mineral fraction, when it is present.

The calcium/magnesium compound content, in the absence of solid mineral fraction, strongly depends on the pH of the emulsion. To regulate the breaking of a tack coat or spreading coat, as a function notably of the pH of the emulsion, of the acid used, the formulator will adjust the calcium/magnesium compound content. Conventionally, this could vary from 0.1 to 6% by weight, advantageously from 0.2 to 3%, more advantageously from 0.2 to 2.5% by weight of calcium/magnesium compound (expressed in dry matter) compared to the total weight of the emulsion. The content could also be adapted as a function of the technical constraints of the pump.

Cationic Bitumen Emulsion

The cationic bitumen emulsion is advantageously obtained by mixing, by weight, compared to the total weight of the emulsion:
  50% to 75% of a bituminous binder,
  25 to 50% of an aqueous phase containing:
  i. 0.1% to 2%, by weight compared to the total weight of the emulsion, of an emulsifying composition
  ii. a sufficient quantity of an acid to adjust the pH of the aqueous phase to a value comprised between 1.5 and 8,
  iii. and water for making the formula up to 100%.

The pH of the aqueous phase varies advantageously between 1.5 and 7, more advantageously between 1.5 and 5.5, even more advantageously between 2 and 3.5.

Binder:

In the emulsion, the binder content varies advantageously from 50 to 75% by weight of binder, compared to the total weight of the emulsion, more advantageously from 60 to 70% by weight.

"Binder" is means any hydrocarbon binder of fossil origin or synthetic that can be used for the realisation of road materials, notably pure bitumen or bitumen modified by addition of polymer(s). The binder may be a synthetic, naphthenic or paraffinic bitumen.

"Paraffinic bitumen" means a bitumen that contains paraffins, advantageously in contents measured by differential scanning calorimetry (DSC) ranging from 0.5 to 4.5% by weight, compared to the weight of the bitumen. A paraffinic bitumen has an acid index less than 2 mg KOH/g of bitumen, advantageously less than 1 mg KOH/g of bitumen.

The acid index of the bitumen is the number of milligrams of potassium hydroxide necessary for the neutralisation of the free acids contained in a gram of bitumen. It may be measured using the protocols described in the ASTM D664-11a standard or the NF T 66-066 standard.

In order to best describe the different families constituting the synthetic binder, the following patents may be cited: FR 1 316 712, GB 1 226 234, EP 0 179 510, EP 0 330 281 and U.S. Pat. No. 5,021,476.

The binder could be a soft to hard binder, advantageously with a grade ranging from 160/220 to 10/20 (penetrability classes according to the NF EN 12591 and NF EN 13924 standards).

For example for a CMBM, the binder is a binder having a penetrability measured according to the EN1426 standard comprised between 50 and 220, more advantageously between 70 and 100.

The binder may comprise additives commonly used in the roadworks field, such as polymers (EVA or ethylene vinyl acetate, SBS or styrene butadiene styrene, SB or styrene butadiene) cross-linked or not, crumb rubber, waxes from plants or of petrochemical origin, adhesion dopes, acids in particular polyphosphoric acids.

The binder may further comprise a fatty acid dope.

The fatty acid dope may be any fatty acid and derivative thereof, in particular fatty di-acids, fatty tri-acids, dimers of fatty acids or trimers of fatty acids, suited for use in a bituminous material.

"Fatty acid" means a mono-, di- or tricarboxylic acid with aliphatic chain, saturated or unsaturated, containing 10 to 28 carbon atoms, advantageously 12 to 20 carbon atoms.

The fatty acids may be of fossil, animal, plant or synthetic origin. They may have undergone chemical functionalisation. Animal origin means for example tallow. Plant origin means plant oils, these are advantageously selected from oils of sunflower, soya, rapeseed, linen, copra, groundnut, olive, corn, castor oil, derivatives thereof and mixtures thereof. These fats may also come from used oils from industry (food processing, paper making, etc.).

"Derivatives of fatty acids" means for example polymerised fatty acids or di-acids or tri-acids of fatty acids. Polymerised fatty acids comprise monomers of fatty acids, dimers of fatty acids and trimers of fatty acids. Di-acid or tri-acid of fatty acids means any fatty acid functionalised by a new carboxylic acid function on at least one of the unsaturations of its hydrocarbon chain, said function having reacted with another carboxylic acid function of another fatty acid or, respectively, fatty di-acid.

The molecular weight of the fatty acid derivatives will be comprised preferentially between 600 and 800 g/mol.

Advantageously, the fatty acid dope has an acid index greater than 100, more advantageously greater than 150, even more advantageously greater than 180.

The acid index of the dope represents the quantity of free acid and is the number of milligrams of potassium hydroxide needed to neutralise the acidity of 1 gram of product, determined by potentiometry.

The fatty acids may be chemically functionalised and thus bear at least one chemical function selected from alcohol, ester, epoxy, peroxide, carboxylic acid and aldehyde functions, advantageously a carboxylic acid function.

The fatty acids are advantageously non-saturated, and advantageously comprise at least two conjugated carbon-carbon double bonds. One or the other of these double bonds may have undergone grafting of maleic anhydride molecules (leading to the formation of carboxylic di-acid functions on the hydrocarbon chain). This functionalisation makes it possible to obtain di-acids or tri-acids linking the fatty acids by oxygen bridges formed on the hydrocarbon chains thereof.

Preferably, the fatty acid is selected from the group constituted of oleic acid, linoleic acid, and mixtures thereof. These fatty acids advantageously come from plant oil(s) or used oils from industry.

The fatty acid dope may be added to the bituminous binder in a mixture with the polymers added to the binder or in line.

The content of fatty acid dope varies advantageously from 0.3% to 2% by weight, compared to the weight of the binder, more advantageously from 0.5 to 1% by weight.

Emulsifiers

The bitumen emulsion is a dispersion of the binder in water, the continuous phase of the system. It comprises an emulsifying composition.

The content of emulsifying composition varies advantageously from 0.1 to 2% by weight, compared to the total weight of the emulsion, more advantageously from 0.13 to 1.2% by weight. The content of emulsifying composition advantageously varies from 1 to 20 kg per tonne of emulsion, more advantageously from 1.3 to 12 kg per tonne of emulsion.

The content of emulsifying composition is also adjusted as a function of the content of calcium/magnesium compound envisaged, notably in order to regulate the workability time.

In an advantageous embodiment, the emulsifying composition mainly comprises at least one amine. In particular, the amine may be selected from:
- alkyl propylene polyamines;
- fatty amines;
- alkyl diamines;
- amido polyamines;
- fatty chain quaternary ammoniums;
- and mixtures thereof.

In the alkyl propylene polyamines or alkyl diamines, the alkyl group is advantageously a hydrocarbon radical, saturated or unsaturated, comprising 8 to 24 carbon atoms, more advantageously 12 to 22 carbon atoms, and/or the immediate cyclisation derivatives thereof as well as oxyethylated or oxypropylated derivatives thereof.

Alkyl propylene polyamines advantageously meeting the formula $R—(NR_4—R_3)_x—NR_1R_2$ in which x is a whole number ranging from 1 to 4. Advantageously x equals 1.

R represents a hydrocarbon radical comprising 8 to 24 carbon atoms, more advantageously 12 to 22 carbon atoms, saturated or unsaturated, linear or branched, potentially cyclised. This radical is advantageously derived from tallow fatty acids.

$R_3$ represents a hydrocarbon radical comprising 1 to 6 carbon atoms, saturated or unsaturated, linear or branched. Advantageously $R_3$ represents an ethylene or propylene radical.

$R_4$ represents a hydrogen atom, a hydrocarbon radical comprising 1 to 6 carbon atoms, saturated or unsaturated, linear or branched, or a $(CH_2—CR_5HO)_zH$ radical in which $R_5$ is a hydrogen atom or a methyl radical, z equals 1 or 2. Advantageously $R_4$ represents a methyl or ethyl radical.

$R_1$ and $R_2$ represent, each, independently of each other, a hydrogen atom, a hydrocarbon radical comprising 1 to 6 carbon atoms, saturated or unsaturated, linear or branched or a $(CH_2—CR_5HO)_zH$ radical in which $R_5$ is a hydrogen atom or a methyl radical, z equals 1 or 2. Advantageously $R_1$ represents a methyl or ethyl radical. Advantageously $R_2$ represents a methyl or ethyl radical. As an example, tallow trimethyl propylene diamine may be cited.

The fatty amines advantageously meet the formula R—NR$_1$R$_2$; R, R$_1$ and R$_2$ being as defined previously. As an example, tallow dimethylamine may be cited.

The alkyl diamines advantageously meet the formula NR$_1$'R$_2$'—R—NR$_1$R$_2$; R, R$_1$ and R$_2$ being as defined previously. R$_1$' and R$_2$' represent, each, independently of each other, a hydrogen atom, a hydrocarbon radical comprising 1 to 6 carbon atoms, saturated or unsaturated, linear or branched or a (CH$_2$—CR$_5$HO)$_z$H radical in which R$_5$ is a hydrogen atom or a methyl radical, z equals 1 or 2.

The amido polyamines respond advantageously to the formula R'CO—(NH—R")$_a$—NH$_2$, in which
R' is a hydrocarbon residue, saturated or unsaturated, linear or branched comprising 12 to 24 carbon atoms, advantageously 16 to 24 carbon atoms. This radical is advantageously derived from fatty acids of tall oil or tallow.
R" is an ethylene radical,
a represents a whole number ranging from 2 to 5, preferably a equals 5
and/or the immediate cyclisation derivatives thereof, in particular imidazoline derivatives.

The amido polyamine is advantageously the reaction product of a fatty acid such as tall oil or tallow with diethanol amine, and/or diethylene triamine, and/or tetra ethylene pentamine and/or triethylene tetramine.

The quaternary ammoniums may in particular be of formula (Rx)$_a$N$^+$(Ry)$_b$Y$^-$ in which
Rx represents a hydrocarbon radical comprising 8 to 24 carbon atoms, more advantageously 12 to 22 carbon atoms, saturated or unsaturated, linear or branched, potentially cyclised
Ry represents an alkyl radical comprising 1 to 6 carbon atoms, potentially hydroxylated, notably methyl, ethyl, propyl, hydroxyethyl, hydroxypropyl
Y$^-$ designates an anion of a mineral acid, in particular a chloride anion, or an organic acid, notably an acetate or formiate anion
b is a whole number equal to (4-a) and a being able to take the values of 1, 2 or 3.

Among relevant surfactants for this application, the following commercially available products may be cited:
Dinoram®S (Ceca) or Redicote®E9 (Akzo Nobel): N-alkyl tallow propylene diamine
Emulsamine®L 60 (Ceca): Preparation based on fatty amide of tall oil, N-(3-dimethylamino)propyls (>50%) and Emulsamine®LZ (>25%) with an aromatic hydrocarbon (>1%) and diethanolamine (>1%)
Polyram®S (Ceca): N-alkyl tallow propylene polyamine with Dinoram®S (<10%), tallow alkyl amines (Noram®S—<5%), tallow nitrile (<10%)
Stabiram®MS 601 (Ceca): solution of N-alkyl tallow N-dimethyl amino propyl N-trimethyl ammonium dichloride (>50%) in a water/hexylene glycol mixture (glycol >20%) with Dinoram®S (<1%)
Dinoram®O (Ceca): N—(C16 and C18 unsaturated alkyl) trimethylene diamine (oleic diamine)
Emulsamine®640 (Ceca): Preparation based on tall oil fatty amides (>50%), Dinoram®O (>25%) and (Z)-octadec-9-enylamine (>1%)
Indulin®R 66 (Meadwestvaco): tall oil fatty amides: N-[(dimethylamino)-3-propyl]
Indulin®OR 33 (Meadwestvaco): tall oil fatty amides (N-[(dimethylamino)-3-propyl]) (75-90%), N-tallow alkyl trimethylene diamine (20-25%)
Indulin®GE F2 (Meadwestvaco): Ethoxylate of nonylphenol (25-35%), alkaline lignin (reaction produced with dimethylamine and formaldehyde) (15-20%), N-(alkyl in C14-18 and unsaturated in C16-18)-trimethylene diamine (5-10%)
Indulin®GE F2 (Meadwestvaco): C12-C14 ethoxylated alcohols (2.5-25%), alkaline lignin (reaction produced with dimethylamine and formaldehyde) (10-20%), N-(alkyl in C14-18 and unsaturated in C16-18)-trimethylene diamine (1-3%)
Duomeen®TTM (Akzo Nobel): tallow trimethyl propylene diamine (90-100%), tallow dimethylamine (5-10%)
Redicote®404 (Akzo Nobel): tall oil, reaction products with tetraethylene pentamine (100%)

One or more of these surfactants, alone or in mixtures thereof, could be used.

The emulsifying composition could also comprise a non-ionic emulsifying agent. This agent could be selected from the family of ethoxylated fatty alcohols, the hydrophobic part of the molecule being able to be of nonylphenol-, octylphenol-, cetyl, oleic type, etc., the hydrophilic part being constituted of several ethoxy groups.

Acid:
The aqueous phase of the emulsifying composition also comprises a sufficient quantity of a mineral or organic acid (for example: citric acid, acetic acid), advantageously a mineral acid. The acid makes it possible to ionise the amine functions of the emulsifiers to enable their dissolution in water.

The acid content is adjusted to the emulsifier content (as a function of the nature of the aggregates, the application temperature, etc.) to have a pH of the aqueous phase comprised between 1.5 and 8, advantageously between 1.5 and 7, more advantageously between 1.5 and 5.5, even more advantageously between 2 and 3.5.

The acid is advantageously hydrochloric acid, phosphoric acid or a polyphosphoric acid. Polyphosphoric acid is a phosphoric acid oligomer comprising molecules according to one or the other of the structural formulas P$_n$O$_{3n+1}^{(n+2)-}$ in which n is a whole number greater than or equal to 1, advantageously 1, 2 or 3, or P$_2$O$_5$.x(O$^{2-}$), in which x is comprised between 0 and 1.

Others:
The emulsion could contain synthetic or natural latex. Latex means a dispersion of polymers (SBS, SB), cross-linked or not, in aqueous phase. This latex is incorporated in the aqueous phase before emulsification or in line during the production of the emulsion or instead after production of the emulsion.

It is also possible to add fluxing agents of petroleum origin or derived from agro-resources. These fluxing agents may be added during the production of the emulsion or during the production of emulsified asphalt mixes.

The fluxing agent is advantageously an oil-based or petrochemical-based fluxing agent. An oil based fluxing agent is a product from the distillation of crude oil (light fraction(s)), having been able to undergo potentially a hydro-treatment operation. In particular, the fluxing agent is selected from the group constituted by the fluxing agents sold by Total (Greenflux® 2000®, Greenflux SD) or by Exxon (Varsol®).

The fluxing agent is advantageously a fluxing agent of natural non-fossil origin (plant or animal origin). A fluxing agent of natural non-fossil origin is constituted of a natural non-fossil oil, of derivatives thereof such as esters of fatty acids and mixtures thereof. These fluxing agents of natural non-fossil origin are well known to those skilled in the art.

Preferentially, plant oils will be used such as oils of sunflower, rapeseed, groundnut, copra, linen, palm, soya, olive, castor oil, corn, gourd, grape seed, jojoba, sesame, walnut, hazelnut, tung oil, tall oil, derivatives thereof, as well as mixtures thereof.

In particular, the fluxing agent of natural non-fossil origin is selected from the group constituted by:
- esters of glycolic, lactic and gluconic acids, methylic, ethylic and isobutylic esters of glutaric, succinic and adipic acids, and mixtures thereof (as described in the application WO2006070104);
- ethers or esters of a product derived from the internal dehydration of a sugar, preferably a hydrogenated sugar, in particular an ether or an ester of isosorbide, sorbitan, isommanide, mannitan, isodide or iditan, or a mixture of at least two of these products, more advantageously dimethylisosorbide (as described in the application WO2006070104);
- acids, esters, in particular monoesters including methylic monoesters, or amides, potentially functionalised by oxidation, obtained from plant or animal oils (oil of pine, sunflower, rapeseed, linen, castor oil, groundnut, copra, olive, palm, cotton, corn, tallow, lard, palm, soya, gourd, grape seed, argan, jojoba, sesame, walnut, hazelnut, tung oil, rice—as described in the applications FR 2 786 603, FR 2 910 477, EP 900 822, FR 2 721 043 or FR 2 891 838), and mixtures thereof
- heavy oils of mineral origin, animal and plant oils and fats, and derivatives thereof functionalised with transesterification products and saponification products and mixtures thereof, organic carboxylic mono-, di- or tri-acids, saturated or unsaturated, having 6 to 24 carbon atoms, which can be branched (as described in the application AT 406 375);
- and mixtures thereof.

A siccative additive, such as manganese octoate, could be added to these oils and derivatives in order to favour oxidation reactions.

Solid Mineral Fraction

"Solid mineral fraction" means herein all solid fractions that can be used for the realisation of bituminous materials for road construction, such as for example defined in the NF EN 13043 standard. The solid fractions that can be used for the realisation of bituminous materials notably comprise natural mineral aggregates (gravel, sand, fines) from quarries or gravel pits, products from recycling such as coated aggregates resulting from the recycling of materials recovered during road repairs as well as surplus from coating plants, aggregates from the recycling of road materials comprising concretes, slags in particular scoria, schists in particular bauxite or corundum, crumb rubber from the recycling of tyres notably, as well as mixtures thereof in all proportions.

Natural mineral aggregates comprise:
- potentially added fines, of which elements are less than 0.063 mm
- sand, the elements of which are comprised between 0 mm and 2 mm or between 0 mm and 4 mm
- gravels, the elements of which have dimensions greater than 2 mm or greater than 4 mm (for example between 2 mm and 6 mm, between 4 mm and 10 mm, etc.)

The size of mineral aggregates is measured by the tests described in the NF EN 933-1 standard (version May 2012).

"Asphalt mix aggregates" means asphalt mixes (mixtures of aggregates and bituminous binders) derived from the milling of asphalt mix layers, the crushing of sheets extracted from asphalt mix road surfaces, pieces of asphalt mix sheets, asphalt mix waste or surplus from asphalt mix production (production surpluses are coated or partially coated materials in coating plants resulting from transitory production phases). These elements and other recycling products could be crushed and/or sieved so as not to exceed a diameter of 20 mm, advantageously 14 mm.

"Solid mineral fractions" are also designated by the terms "0/D mineral fraction".

This 0/D mineral fraction may be separated into several particle sizes as a function of the raw materials selected and the applications: the $0/d_1$ mineral fraction and the $d_1/dx$ and $dx/D$ mineral fractions.

Generally, for CMBM, 0/D particle sizes of 0/4, 0/6, 0/6 discontinuous, 0/8, 0/8 discontinuous or 0/10 recomposed are used, with potentially humidification to limit segregation during transport. The solid mineral fraction advantageously comprises from 6 to 10% by weight of fines, compared to the total weight of the mineral fraction.

The solid mineral fraction is mixed with a bitumen emulsion to lead to a bituminous road material obtained by coating. The solid mineral fraction advantageously constitutes 80 to 97%, more advantageously 85 to 96%, of the weight of bituminous material.

It is also possible to add to the solid mineral fraction fibres, advantageously cellulose fibres. In particular, the fibres are made of polyacrylonitrile of size comprised between 4 and 12 mm. The fibre content advantageously varies from 0.05 to 0.5 ppc (parts percent by weight)/dry aggregates, preferentially between 0.07 and 0.2 ppc.

Bituminous Road Materials:

These cationic bitumen emulsions are used in the production of bituminous road materials, which can be obtained by coating or by spreading. The areas of use of bitumen emulsions are well known to those skilled in the art, who may for example refer to the bitumen emulsions guides, SFERB and USIRF.

The material is advantageously selected from CMBM materials, emulsified asphalt mixes, grave emulsion, emulsified bituminous concretes. The materials may in particular serve for producing surface layers, tack coats, base coats, binder layers.

In a first variant, the bituminous road materials are obtained by coating.

The invention relates to a bituminous road material obtained by mixing a solid mineral fraction with a cationic bitumen emulsion, of the type binder in water, characterised in that an aqueous suspension of solid particles of a calcium/magnesium compound of formula (A), such as formula (AA), is added to the mineral fraction. The mineral fraction, the emulsion and the calcium/magnesium compound are as defined previously.

In the bituminous material, the residual binder content is advantageously comprised between 5 and 12%, more advantageously between 6 and 10% compared to the weight of dry aggregates.

The invention also relates to a method for preparing such a material, comprising the following steps
- a. adding, to a solid mineral fraction, an aqueous suspension of solid particles of a calcium/magnesium compound of formula (A), such as formula (AA), as defined previously
- b. If need be, adding to the solid mineral fraction added water and/or a setting retarder additive
- c. Adding the solid mineral fraction from step a) or b) to a cationic bitumen emulsion The steps may advantageously be carried out in the following sequential order, a, b, c or b, a, c or b, c+a ("c+a" signifying that steps a and c are carried out at the same time).

To the solid mineral fraction is added (step a) an aqueous suspension of solid particles of a calcium/magnesium compound as described above. It is also possible to add fibres, as described above.

As a function of the climatic conditions and the state of dryness of the solid mineral fraction, the operator may add, to the solid mineral fraction, added water.

As a general rule, the content of total weight of water of the solid mineral fraction, constituted of added water and water naturally present in the solid mineral fraction, varies according to the applications from 5 to 15%. The percentages are expressed by weight compared to the total weight of the solid mineral fraction.

The operator may also add a dope (potentially diluted solution of an emulsifier), that will serve mainly as setting retarder. These emulsifiers may be fatty amines but also quaternary ammoniums.

In a preferential embodiment, the calcium/magnesium compound and/or the setting retarder additive is not powdery: it is advantageously in the form of a suspension. Thus, the operators do not have to handle powdery products.

In a second variant, the bituminous road materials are obtained by spreading. This notably enables the production of tack coats.

The invention also relates to a method for obtaining a tack coat on a support by spreading a cationic bitumen emulsion, characterised in that it comprises the following steps:
 i. application of the cationic bitumen emulsion on the support,
 ii. application of a breaking agent,
characterised in that the breaking agent comprises an aqueous suspension of solid particles of a calcium/magnesium compound of formula (A), such as formula (AA), as defined previously.

Step i. could be preceded by a step of applying water on the support.

The breaking agent may be:
 mixed with the emulsion in the nozzle before spraying
 projected onto the bituminous emulsion brush falling from the spreader (FR2573455)
 projected onto the bituminous emulsion.

In this latter case, the breaking agent is projected simultaneously with the bituminous emulsion falling on the spreader. This arrangement enables the breaking in bulk of the bituminous emulsion.

In this method, the content of calcium/magnesium compound varies advantageously from 0.1 to 6% by dry weight, advantageously from 0.2 to 3%, by weight of calcium/magnesium compound compared to the total weight of the emulsion.

This tack coat then serves for the adhesion of a bituminous road material, advantageously an asphalt mix layer.

In these methods, the content of each of the components, in particular of the calcium/magnesium compound, is as described previously.

The invention will now be explained with a particular example of road material, cold mix bituminous materials (CMBM). CMBM, also known as cold micro asphalt concrete surfacing, are asphalt mixes made from aggregates, an emulsion of hydrocarbon binder and potentially dopes and/or additives, the characteristics of which enable coating without drying or heating of the aggregates.

After its implementation and breaking of the emulsion, this coating, which flows when cold at very small thicknesses (generally from 6 to 13 mm thickness per layer) has to reach its definitive consistency (rise in cohesion) very rapidly. The formulator thus has to conjugate two contradictory aspects: to obtain a fluid material just after production so as to be able to apply it as a thin layer, then, once applied, to obtain a rise in cohesion as quickly as possible so as to reopen the roadworks to traffic as soon as possible, thus limiting inconvenience to road users.

Thus, the essential parameters governing the formulation of CMBM are the following:
 the initial workability of the CMBM: optimisation of the proportions of the different constituents (water, additives, formulation of the emulsion, etc.) to obtain a sufficient implementation period and thus to enable the mixing of the aggregates with the emulsion in the mixer. A workability time (tm), also called fluidity or consolidation time, is defined as the duration between (1) the placing in contact of the solid mineral fraction and the bitumen emulsion and (2) the start of setting of the CMBM.
 the kinetic of "rise in cohesion": the CMBM, once applied onto the roadway, must acquire a rise in cohesion as quickly as possible for opening up to traffic. For setting temperatures ranging from 7 to 40° C., a period of 30 minutes is considered as relevant for those skilled in the art in order to respond to the strictest requirements definition. The physical-chemical origin of this rise in cohesion is linked to the passage from an initial phase where the bituminous binder is in the form of fine droplets in water (emulsion), which thus confers an initially liquid character to the CMBM, to a final phase where the bituminous binder forms a continuous film with strong cohesion, which gives to the CMBM its traffic resistance. The destabilisation of the emulsion, via for example the use of a breaker, makes it possible to control the intermediate phases where the droplets of bituminous binder firstly aggregate together to form a gel then amalgamate, leading to the contraction of the gel. These processes follow a kinetic that notably depends on electrostatic repulsions between droplets and thus the nature of the bituminous binder, the emulsifier and the overall composition of the aqueous phase (pH, ions), This kinetic determines the rapidity of the rise in cohesion of the CMBM, which could result in sensitivity or not of the material to setting conditions at young age. Since these phenomena are eminently complex, it is checked that the rise in cohesion is correct by means of several parameters.

Firstly, the workability time (tm) defined above quantifies the time during which the emulsion remains sufficiently fluid, thus enabling the implementation of the CMBM. A cohesion time (tc) is also defined, as the time for which the cohesion of the CMBM is sufficient for opening it up to traffic. Between these two extremes, a break time, tr, is in addition defined, for which the emulsion in the cold mix bituminous material is totally broken.

Finally, in addition to the measurement of the cohesion time, good resistance to traffic is also evaluated by the wear resistance (or the abrasion resistance). This is done via a test carried out after a more or less long setting time to ensure the durability of the cold mix bituminous material after re-subjecting it to traffic. In particular, it is wished to avoid the departure of the aggregate under traffic (sometimes called "gritting").

The present invention makes it possible to obtain CMBM that have a good rise in cohesion. This is governed by several phenomena, notably the workability time, the break time and the wear resistance.

Workability Time

The workability time defined above measures the time during which the mixture remains fluid, thus enabling easy application using specific machines for CMBM. In order to measure it, laboratory tests are carried out in a recipient on mixes of 400 g to 1000 g of dry materials. After bringing the constituents into contact, the operator starts his stopwatch and visually assesses the change of state of the cold mix bituminous material (passage from the liquid state to the pasty state) while stirring it manually with a spatula at constant speed. When the operator considers that the mixture becomes too viscous, he stops the stopwatch and notes the corresponding time as the workability time of the formula tested.

This test is carried out at a controlled temperature (conventionally between 20 and 25° C.). The requirements are a workability time greater than 90 s, advantageously comprised between 90 and 180 s, more advantageously comprised between 90 and 120 s.

Break Time

The "break time" defined above, characterises the time necessary for the bituminous binder to lose its initial emulsion form. This break time is measured using a cohesion apparatus (NF EN 12274-4) thanks to which a blotting paper, subjected to a pressure of 0.2 MPa, is applied to the surface of a cake of CMBM subjected to the test. The break time corresponds to the time from which the paper is no longer stained by the emulsion. Within the scope of the present the invention, the break time is advantageously less than 20 min.

Cohesion Time/Fracture Test/Wear Resistance

Rather than measuring directly a cohesion time, as defined above as being the time from which the CMBM becomes able to withstand traffic, it appears simpler to measure the cohesion of the CMBM after a given time, for example half an hour, and to ensure that the cohesion is then sufficient via the fracture test.

Fracture Test

This test makes it possible to quantify the cohesion of CMBM. CMBM test samples of 120*120*10 mm dimensions are manufactured after having checked the setting time. After a time of 30 minutes at 18° C.-20° C., 55% hygrometry, the CMBM is removed from the mould and positioned on the apparatus with a counterweight placed on the fixed part (in general, half of the coated material is placed in empty space). The time necessary for the break of the coated material when subjected to its own weight after opening the trap door is then measured. The result is given in seconds and represents the fracture time. The longer the fracture time, the more the cold mix bituminous material is resistant and thus the more the rise in cohesion is advanced. It is considered that the rise in cohesion is good if in the standard conditions of conservation (30 min at 18° C.-20° C., 55% hygrometry) the time after which the fracture occurs is greater than 10 s, advantageously greater than 15 s. As a function of the granular fraction, it is possible to obtain fracture times of the order of 50 s or 70 s.

According to the invention, this test is carried out with a paraffinic bitumen. It is possible to carry out a reference test with a naphthenic bitumen. In the invention, a fracture time at least as long as the reference test is sought.

Modification of the Standardised Resistance to Wear Test WTAT (Wet Track Abrasion Test)

The NF EN 12274-5 (4.3.2) test may be used as described in the standard and in this case the cohesion of a cold mix bituminous material is evaluated after a favourable setting (at least 15 h at 60° C.).

However, this standardised test is not representative of actual implementation on the worksite; the setting conditions are too favourable. In order to get closer to the problems of the kinetic of rise in cohesion at a young age, another test has been developed.

This test consists in carrying out a wear test as described in the NF EN 12274-5 standard after more severe setting conditions to qualify the mechanical performances of the cold mix bituminous material when it is subjected to traffic. Two tests were carried out per formula, after one hour of setting at ambient temperature:

18 h at 55% hygrometry and 18° C.: favourable setting conditions, simulation of setting in dry weather 18 h at 100% hygrometry and 18° C.: unfavourable setting conditions, simulation of setting in wet weather After these settings, the test samples are immersed for 1 hour in water before being abraded under water for 5 minutes at ambient temperature.

The aim of this test is to evaluate the influence of the setting conditions (temperature, hygrometry) on the mechanical properties at young age of a cold micro asphalt concrete surfacing. This test may be carried out at three temperatures (10, 18 or 30° C.) and at two different hygrometries (55 and 100%).

It is considered that a CMBM is suitable if the weight loss (compared to the abraded zone) as a function of the setting conditions is:

<5% loss if the hygrometry is 55%, at 18° C.

<25% loss if the hygrometry is 100%, at 18° C.

For CMBM based on paraffinic or synthetic bitumen, the target pH is comprised between 7 to 9, and preferentially between 7.5 and 8.5. Advantageously, the acid/base pairing is chosen so that it makes it possible to attain progressively this target value. pH rise curves with calcium/magnesium slurries according to the invention are given in the examples.

In a surprising manner, the aqueous suspensions of calcium/magnesium compounds according to the invention make it possible to buffer efficiently the bitumen emulsion/solid mineral fraction mixtures whereas the use of a hydrated lime slurry does not work in the presence of paraffinic bitumen, whatever the acid used to produce the emulsion (in particular phosphoric acid or hydrochloric acid).

The addition of a slurry of the calcium/magnesium compound makes it possible to improve workability without loss of adhesiveness.

Furthermore, as a function of the concentration of calcium/magnesium compound, its nature (ratio of the calcium phase and the magnesium phase), the petrographic nature of the aggregates, it is possible to predict an increase in the emulsifier content (for example from one to several kg/tin the emulsion) and/or the addition of retarder to improve the adhesion properties, for example during off-season.

This cold mix bituminous material has good mechanical properties, compatible with the desired uses, in particular coating quality, the solidity of the coating (no ravelling), the abrasion resistance (WTAT tests).

The examples that follow illustrate the invention but are not limiting. Cold mix bituminous materials are used to illustrate the mechanical properties of road materials obtained according to the invention.

CAPTION FOR THE FIGURES

For all the figures: abscissa: time in min, ordinate: pH

FIG. 1:
Solid line, diamonds: . . . HCl/lime
Dotted line, squares: . . . $H_3PO_4$/lime
Dotted line, triangles: . . . HCl/cement
Dotted line, crosses: . . . $H_3PO_4$/cement
Solid line, stars: . . . HCl/slurry of SLS 33 lime
Dashes, circles: . . . $H_3PO_4$/slurry of SLS 33 lime FIGS. 2 and 3:
Solid line, triangles: HCl/slurry of lime n° 1
Dashes, triangles: $H_3PO_4$/slurry of lime n° 1
Solid line, circles: HCl/slurry n° 2
Dashes, circles: $H_3PO_4$/slurry n° 2
Solid line, squares: HCl/slurry n° 3
Dashes, squares: $H_3PO_4$/slurry n° 3
Dotted lines, crosses: $H_3PO_4$/cement

EXAMPLE 1: PH RISE TESTS

The rise in pH of a cold mix bituminous mixture is simulated by measuring the evolution of the pH of a solution comprising:
- 20 g of filler <63 μm
- 18 g of demineralised water
- 11 g of water acidified to pH=2 (with HCl or $H_3PO_4$ acid)
- 0.1 g of mineral additive (0.5 ppc/dry filler)—this value is expressed by weight of the suspension.

With Reference Additives:
The pH rise in a cold mix bituminous material (CMBM) was simulated in the presence of hydrated lime (Asphacal® H from the Lhoist de Boran factory), hydrated lime slurry (Asphacal SLS33 from the firm Lhoist) or cement (CEM II 32.5) with hydrochloric acid or phosphoric acid.
These tests were carried out with 63 μm passing from the Moreau quarry.
The results are shown in FIG. 1.
The pH rise curves of FIG. 1 clearly show that cement in the presence of phosphoric acid makes it possible to buffer the pH of the medium to a plateau close to 8 after stabilisation. For more important pH rises, the CMBM have either too short workability times or a too long kinetic of rise in cohesion, or even adhesiveness defects.

With the Compounds According to the Invention:
Four calcium/magnesium slurries were tested:
- Slurry n° 1: industrial product supplied by Lhoist, containing 30% by weight of semi-hydrated dolomitic lime of composition, after being placed in suspension, n=0.460, m=0.065 i.e. x=0.525, and a=0.440, b=0.035, c=0.000 i.e. y=0.475 and x/y=1.11) and I=2.3%. This slurry has a d50 of 35 μm and a d90 of 152 μm.
- Slurry n° 2: dilution to 10% by weight of dry matter of slurry n° 1, thus having the same composition and the same particle size.
- Slurry n° 3: Industrial solution of magnesia ($Mg(OH)_2$) obtained by precipitation from marine $MgCl_2$ and lime, diluted to 10% by weight, of composition after being placed in suspension n=0.010, m=0.000 i.e. x=0.010, a=0.000, b=0.959, c=0.031 (i.e. y=0.990 and x/y=0.010) and I=1.09%. This slurry has a d50 of 7 μm and a d90 of 27 μm.
- Slurry n° 4: Mixture of 60% by weight of calcium carbonate slurry ($CaCO_3$) obtained by placing in suspension 75% by weight of ground $CaCO_3$ with a d50 of 1.6 μm and a d90 of 12 μm, and 40% by weight of slurry n° 3. This gives for slurry n° 4 a composition after being placed in suspension n=0.004, m=0.557 i.e. x=0.561, a=0.000, b=0.422, c=0.017 (i.e. y=0.435 and x/y=1.28) and I=1.27%.

Figure 2:
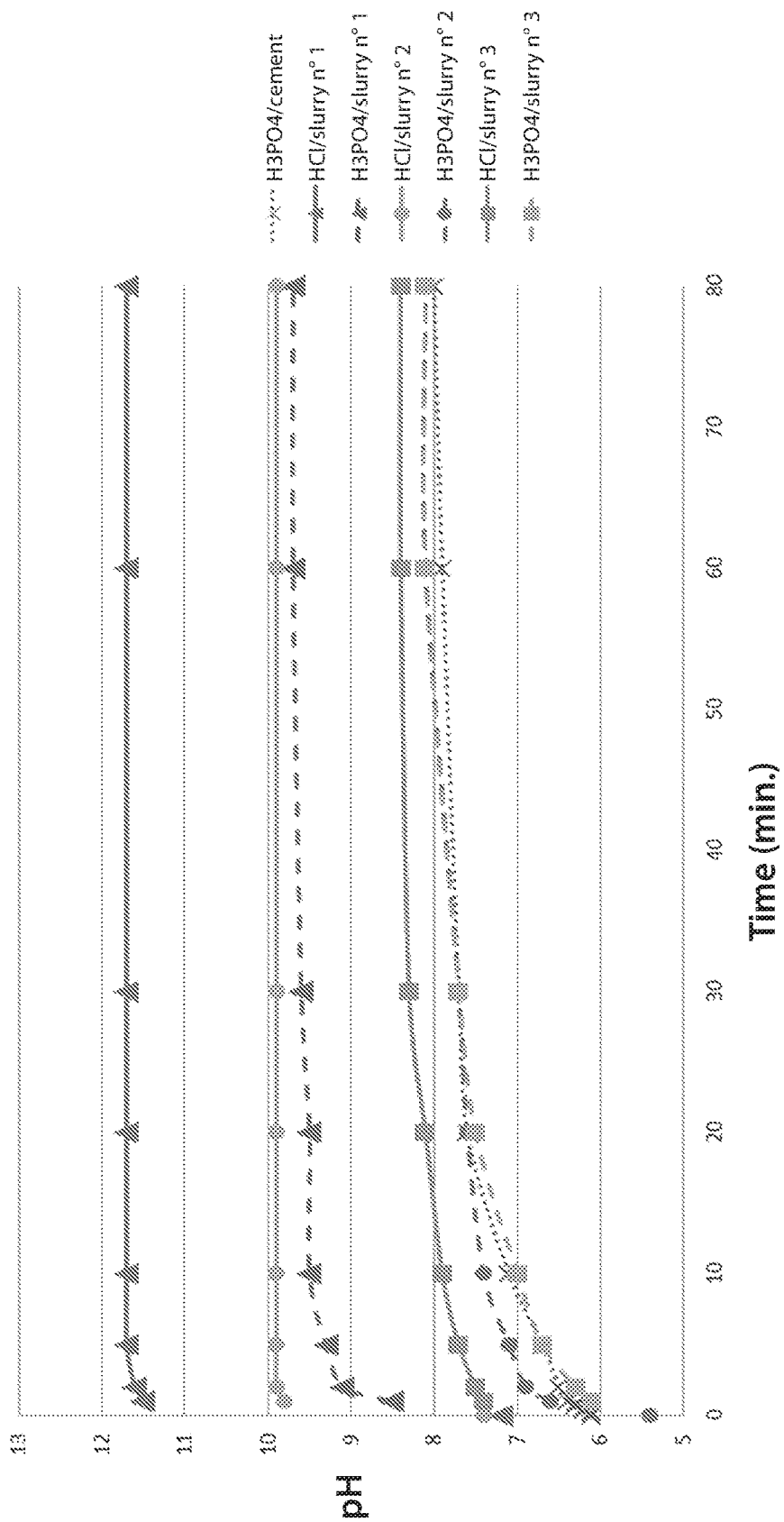
FIG. 2 : Rise of the pH as a function of time in a CMBM comprising 20 g of a filler (63 μm passing from the Moreau quarry), 18 g of demineralised water, 11 g of water acidified to pH =2 with an acid (HC1 or $H_3PO_4$) and 0.1 g of a mineral additive (cement or slurry of lime n° 1, 2 or 3 of the present invention) : solid line, triangles: CMBM with HC1/slurry n° 1; dashes, triangles : CMBM with $H_3PO_4$/slurry n° 1; solid line, circles : CMBM with HC1/ slurry n° 2; dashes, circles : CMBM with $H_3PO_4$/slurry n° 2; solid line, squares : CMBM with HC1/slurry n° 3; dashes, squares : CMBM with $H_3PO_4$/ slurry n° 3; dotted line, crosses : CMBM with $H_3PO_4$/cement (reference).

The tests were carried out with 63 μm passing from the Moreau quarry. The results are shown in FIG. 2 (the $H_3PO_4$/cement curve is also shown for comparison).

Slurries n° 3 and n° 2 have a pH rise in the presence of phosphoric acid equivalent to that measured with the cement/$H_3PO_4$ pairing.

Slurry n° 3 in the presence of hydrochloric acid has a pH rise close to the cement/$H_3PO_4$ pairing.

Slurry n° 4 (not represented) has the same pH rise as slurry n° 3.

Figure 3:
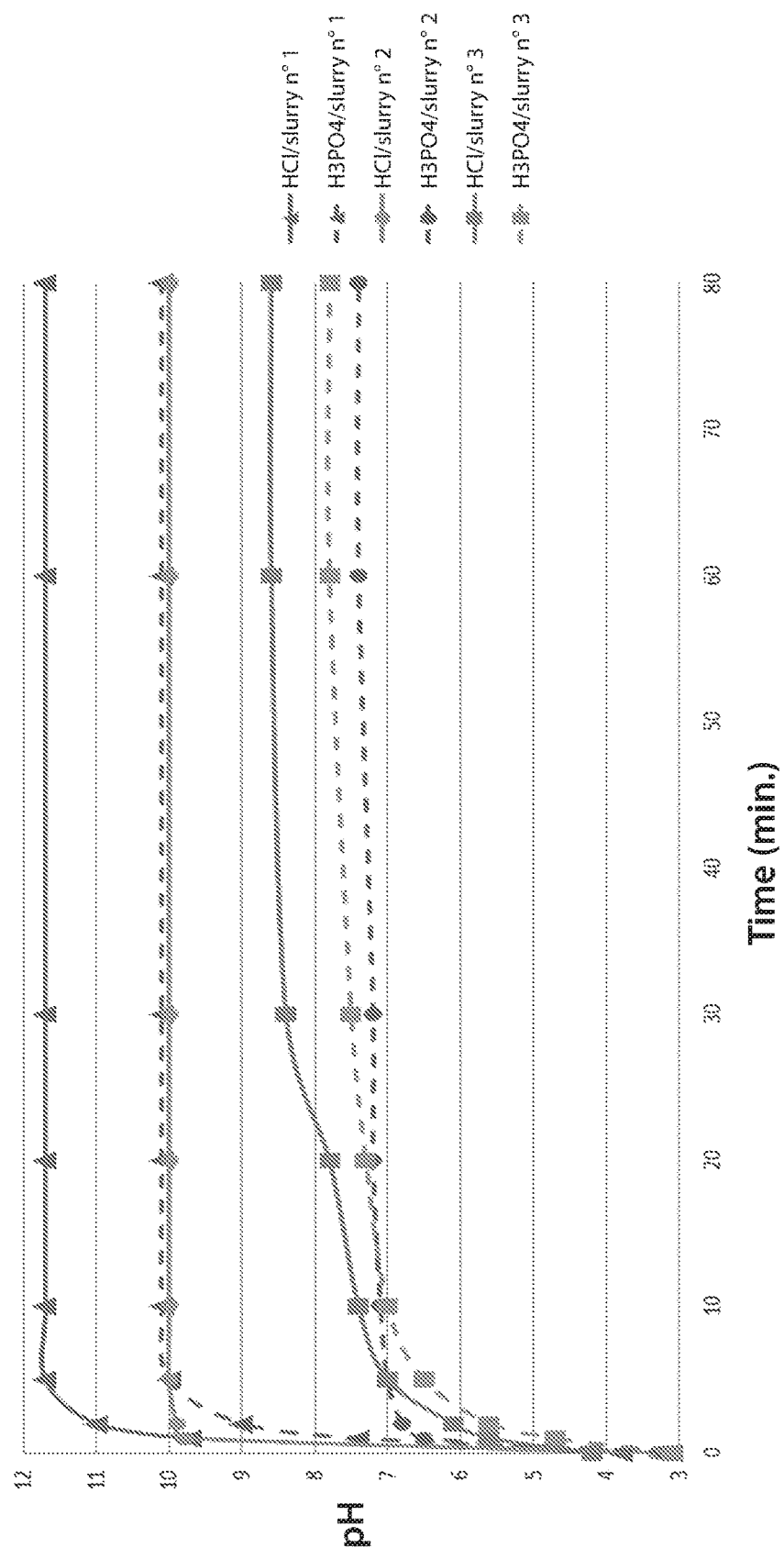
FIG. 3 : Rise of the pH as a function of time in a CMBM comprising 20 g of a filler (acid aggregate Duro), 18 g of demineralised water, 11 g of water acidified to pH =2 with an acid (HC1 or $H_3PO_4$) and 0.1 g of a mineral additive (cement or slurry of lime n° 1, 2 or 3 of the present invention) : solid line, triangles : CMBM with HC1/slurry n° 1; dashes, triangles : CMBM with $H_3PO_4$/slurry n° 1; solid line, circles : CMBM with HC1/ slurry n° 2; dashes, circles : CMBM with $H_3PO_4$/slurry n° 2; solid line, squares : CMBM with HC1/slurry n° 3; dashes, squares : CMBM with $H_3PO_4$/ slurry n° 3; dotted line, crosses : CMBM with $H_3PO_4$/cement (reference).

To ensure the buffer power of these new calcium/magnesium slurries, these pH rise tests were also carried out with an acid aggregate (Duro): FIG. 3. Compared to the pH rise curves obtained with Moreau materials, no significant difference was observed after stabilisation.

EXAMPLE 2: CMBM WITH A CALCIUM/MAGNESIUM SLURRY ACCORDING TO THE INVENTION AND COMPARATIVE

Tests of formulations of CMBM with calcium/magnesium slurries according to the invention, of hydrated lime and of cement were carried out. The aggregates used for these tests came from the Moreau quarries. Slurry n° 2 as defined in example 1 was used.
Three emulsion formulas were used:

TABLE 1

| | Formulas | F1 | F2 | F3 |
|---|---|---|---|---|
| Bitumen | Nature | 70/100 Paraffinic + 0.8% Radiacid ® 121 | 70/100 Paraffinic + 0.8% Radiacid ® 121 | 70/100 Naphthenic |
| | Content (kg/t) | 600 | 600 | 600 |
| Aqueous phase | Emulsifier* Nature | Duomeen ® TTM/ Redicote ® 404 | Duomeen ® TTM/ Redicote ® 404 | Stabiram ® MS 301 |
| | Content (kg/t) | 3/2 | 4,5/3 | 9 |
| | Acid Nature | $H_3PO_4$ | $H_3PO_4$ | HCl |
| | Content (kg/t) | 4 | 8 | 1.2 |
| | Water (kg/t) | 400 | 400 | 400 |

*The brand names are defined in the description

The solid mineral fraction is constituted of aggregates from the Moreau quarry with the following particle sizes: 40% 0/2+30% 2/4+30% 4/6. The solid mineral fraction further comprises 0.07 ppc (parts per 100 by weight) of fibres.
The emulsion content is 11.2 ppc.
The values are expressed by weight compared to the total weight of the mineral fraction.
The CMBM formulas are the following:

TABLE 2

| | CMBM formula | 1 | 2 | 3 | 4 | 5 | 6 |
|---|---|---|---|---|---|---|---|
| | Aggregate | Moreau | Moreau | Moreau | Moreau | Moreau | Moreau |
| | Emulsion formula | F3 | F1 | F1 | F2 | 20% F1 + 80% F2 | 80% F1 + 20% F2 |
| Mineral additive | Nature | Lime | Lime | Cement | Slurry no2 | Slurry no3 | Slurry no4 |
| | Content (ppc/aggregates) | 0.5 | 0.5 | 0.5 | 0.5 | 0.5 | 0.5 |
| | Damping water (ppc/dry aggregates) | 10 | 10 | 11 | 10 | 10 | 10 |
| | Workability time (s) | 90 | <5 | 90 | 130 | 140 | 120 |
| | Break time (min) | 5 | — | 5 | 5 | 4 | 5 |
| | Fracture time (s) | 12 | — | 25 | 24 | 40 | 12 |
| | WTAT (%) 18° C. 55% RH | 3 | — | 4 | 4 | 3 | 4 |

The percentages of the emulsions F1 and F2 are expressed by weight, compared to the total weight of the emulsion F1+F2.
It may be noted that the use of a calcium/magnesium slurry according to the invention makes it possible to obtain a CMBM with satisfactory properties. The CMBM formulas n° 1, 3 and 4 make it possible to obtain a material meeting all of the requirements of CMBM. For a paraffinic bitumen with these emulsifiers, the use of lime does not enable the production of a CMBM with the expected requirements definition (not sufficient workability). The calcium/magnesium slurry according to the invention, just like cement, enables the production of a compliant CMBM. Compared to cement, the calcium/magnesium slurry according to the invention has the non-negligible advantage of not being powdery.

The invention claimed is:

1. A method for regulating the breaking of a cationic bitumen emulsion comprising a step of mixing a solid mineral fraction with said cationic bitumen emulsion in presence of an aqueous suspension, said aqueous suspension consisting in water and solid particles of calcium, magnesium and/or calcium/magnesium compounds so that said aqueous solution includes
$nCa(OH)_2$, $mCaCO_3$, $aMgO$, $bMg(OH)_2$, $cMgCO_3$, and I, wherein
n, m, a, b and c represent molar coefficients for each species in suspension in the aqueous phase such that
n+m=x represents the proportion of calcium phase present in the aqueous suspension and where $0<x\leq 1$,
a+b+c=y represents the proportion of magnesium phase present in the aqueous suspension and where $0<y\leq 1$,
x/y represents the calcium phase/magnesium phase ratio,
I represents impurities present in natural calcium/magnesium compounds or compounds of silicates or aluminates of calcium and/or magnesium type,
said calcium, magnesium and/or calcium/magnesium compounds being a regulating agent, wherein said regulating agent is added to the solid mineral fraction before or during the mixing of the cationic bitumen emulsion with the solid mineral fraction.

2. The method according to claim 1, wherein in the aqueous suspension, the ratio x/y is comprised between 0.7 and 1.3.

3. The method according to claim 1, wherein in the aqueous suspension, the ratio x/y is around 1.

4. The method according to claim 1, wherein in the aqueous suspension, a equals 0.

5. The method according to claim 1, wherein in the aqueous suspension, x is greater than 0 and equal to or less than 0.1 and a and c are each close to 0.

6. The method according to claim 1, wherein in the aqueous suspension, the percentage by weight of I, compared to the total weight of the calcium, magnesium and/or calcium/magnesium compounds, varies from 0.1 to 10%.

7. The method according to claim 1, wherein in the aqueous suspension, the percentage by weight of I, compared to the total weight of the calcium, magnesium and/or calcium/magnesium compounds, varies from 0.2 to 5%.

8. The method according to claim 1, wherein in the aqueous suspension of solid particles, the solid particles content by weight is greater than 5% by weight compared to the total weight of the suspension.

9. The method according to claim 1, wherein in the aqueous suspension of solid particles, the solid particles content by weight is greater than 10% by weight compared to the total weight of the suspension.

10. A bituminous road material obtained by mixing a solid mineral fraction with a binder-in-water cationic bitumen emulsion, wherein an aqueous suspension of solid particles of calcium, magnesium and/or calcium/magnesium compounds as defined in claim 1 is added to the solid mineral fraction.

11. The material according to claim 10, wherein said cationic bitumen emulsion is obtained by mixing, by weight compared to the total weight of the emulsion:
50% to 75% of a bituminous binder,
25 to 50% of an aqueous phase containing:
i. 0.1% to 2%, by weight compared to the total weight of the emulsion, of an emulsifying composition
ii. a sufficient quantity of an acid to adjust the pH of the aqueous phase to a value comprised between 1.5 and 8 of an acid and water to make up the formula to 100%.

12. The material according to claim 11, wherein the emulsifying composition comprises an amine.

13. The material according to claim 12, wherein said amine is selected from alkyl propylene polyamines, fatty amines, alkyl diamines, amido polyamines, fatty chain quaternary ammoniums and mixtures thereof.

14. The material according to claim 10, wherein the calcium, magnesium and/or calcium/magnesium compounds content, expressed in dry solids, varies from 0.01 to 0.5 parts percent by weight compared to the weight of the solid mineral fraction.

15. The material according to claim 10 selected from cold mix bituminous materials, emulsified asphalt mixes, grave emulsion, emulsified bituminous concretes.

16. A method for preparing a material according to claim 10, comprising the following steps
   a. adding, to a solid mineral fraction, an aqueous suspension of solid particles of calcium, magnesium and/or calcium/magnesium compounds so that said aqueous solution includes $nCa(OH)_2$, $mCaCO_3$, $aMgO$, $bMg(OH)_2$, $cMgCO_3$, and I, wherein
      n, m, a, b and c represent molar coefficients for each species in suspension in the aqueous phase such that
         n+m=x represents the proportion of calcium phase present in the aqueous suspension and where $0<x\leq1$
         a+b+c=y represents the proportion of magnesium phase present in the aqueous suspension and where $0<y\leq1$
         x/y represents the calcium phase/magnesium phase ratio
      I represents impurities present in natural calcium/magnesium compounds or compounds of silicates or aluminates of calcium and/or magnesium type,
   b. optionally, adding to the solid mineral fraction added water and/or a setting retarder additive
   c. adding the solid mineral fraction from step a) or b) to a cationic bitumen emulsion.

17. A method for obtaining a tack coat on a support by spreading a cationic bitumen emulsion, comprising the following steps:
   i. application of the cationic bitumen emulsion, as defined in claim 11, on the support,
   ii. application of a breaking agent,
   wherein the breaking agent comprises an aqueous suspension of solid particles of calcium, magnesium and/or calcium/magnesium compounds so that said aqueous solution includes $nCa(OH)_2$, $mCaCO_3$, $aMgO$, $bMg(OH)_2$, $cMgCO_3$, and I, wherein
      n, m, a, b and c represent molar coefficients for each species in suspension in the aqueous phase such that
         n+m=x represents the proportion of calcium phase present in the aqueous suspension and where $0<x\leq1$
         a+b+c=y represents the proportion of magnesium phase present in the aqueous suspension and where $0<y\leq1$
         x/y represents the calcium phase/magnesium phase ratio
      I represents impurities present in natural calcium/magnesium compounds or compounds of silicates or aluminates of calcium and/or magnesium type.

18. The method according to claim 17, wherein the calcium, magnesium and/or calcium/magnesium compounds content varies from 0.1 to 6% by weight of calcium/magnesium compound compared to the total weight of the emulsion.

19. The method according to claim 17, wherein the calcium, magnesium and/or calcium/magnesium compounds content varies from 0.2 to 3% by weight of calcium/magnesium compound compared to the total weight of the emulsion.

* * * * *